(12) United States Patent
Abdella et al.

(10) Patent No.: US 10,234,073 B2
(45) Date of Patent: Mar. 19, 2019

(54) MODULAR PLASTIC MOTOR BRACKET

(71) Applicant: Lear Corporation, Southfield, MI (US)

(72) Inventors: David J. Abdella, Royal Oak, MI (US); John R. Sims, Dearborn, MI (US); Kirk P. Koenig, Waterford, MI (US)

(73) Assignee: Lear Corporation, Southfield, MI (US)

( * ) Notice: Subject to any disclaimer, the term of this patent is extended or adjusted under 35 U.S.C. 154(b) by 98 days.

(21) Appl. No.: 15/245,643

(22) Filed: Aug. 24, 2016

(65) Prior Publication Data
US 2018/0058626 A1    Mar. 1, 2018

(51) Int. Cl.
| | |
|---|---|
| *B60N 2/02* | (2006.01) |
| *B60N 2/06* | (2006.01) |
| *F16M 13/02* | (2006.01) |
| *H02K 5/00* | (2006.01) |
| *B60N 2/90* | (2018.01) |
| *B60N 2/68* | (2006.01) |

(52) U.S. Cl.
CPC .............. *F16M 13/02* (2013.01); *B60N 2/067* (2013.01); *B60N 2/682* (2013.01); *B60N 2/90* (2018.02); *H02K 5/00* (2013.01); *B60N 2/0232* (2013.01); *B60N 2/06* (2013.01); *B60N 2002/024* (2013.01)

(58) Field of Classification Search
CPC .... B60N 2/0232; B60N 2/067; B60N 2/0705; B60N 2002/024; F16M 13/02; H02K 5/00; F16C 2326/08
USPC .............. 248/429, 420, 422, 424; 296/65.01, 296/65.13, 65.15; 297/312, 330, 311, 297/344.1
See application file for complete search history.

(56) References Cited

U.S. PATENT DOCUMENTS

| | | | |
|---|---|---|---|
| 3,222,025 A | * | 12/1965 | Pickles ................ B60N 2/0224 248/397 |
| 6,305,658 B1 | | 10/2001 | Kita |
| 6,729,598 B2 | | 5/2004 | Folliot et al. |

(Continued)

FOREIGN PATENT DOCUMENTS

| | | |
|---|---|---|
| DE | 10060857 A1 | 6/2002 |
| DE | 102008005774 B3 | 7/2009 |

(Continued)

OTHER PUBLICATIONS

English Abstract of DE 10060857.
(Continued)

*Primary Examiner* — Tan Le
(74) *Attorney, Agent, or Firm* — Fishman Stewart PLLC

(57) ABSTRACT

The present disclosure includes a motor bracket including a first body portion, a second body portion, and/or a third body portion that may be configured to receive a drive shaft. The second body portion may be connected to the first body portion via a plurality of connecting members. At least a portion of the third body portion may be disposed inside the second body portion. The first body portion may include a plurality of wings extending in an outward direction from the first body portion. At least one of the plurality of wings may include an accessory aperture. Each wing may include a plurality of endcap apertures. The first body portion may include a substantially L-shaped flange. The flange may include a hooked portion. The first body portion, the second body portion, and/or the third body portion may each have different radii.

20 Claims, 7 Drawing Sheets

(56) References Cited

U.S. PATENT DOCUMENTS

| | | |
|---|---|---|
| 6,808,233 B2 | 10/2004 | Mallard |
| 6,837,544 B2 | 1/2005 | Bornchen et al. |
| 6,905,163 B2 | 6/2005 | Bornchen et al. |
| 7,051,986 B1 | 5/2006 | Taubmann et al. |
| 7,099,761 B2 | 8/2006 | Woller et al. |
| 7,143,513 B2 | 12/2006 | Taubmann et al. |
| 7,437,962 B2 | 10/2008 | Taubmann et al. |
| 7,669,824 B2 | 3/2010 | Woehrle et al. |
| 7,703,347 B2 | 4/2010 | Porinsky et al. |
| 8,146,991 B2 | 4/2012 | Stanz et al. |
| 8,226,063 B2 | 7/2012 | Weber |
| 8,328,154 B2 | 12/2012 | Beneker et al. |
| 8,328,155 B2 | 12/2012 | Kostin |
| 8,540,203 B2 | 9/2013 | Ruess et al. |
| 8,548,687 B2 | 10/2013 | Jefferies et al. |
| 8,925,887 B2 | 1/2015 | Veen et al. |
| 9,056,559 B2 * | 6/2015 | Thuleau ............... B60N 2/0232 |
| 2005/0015986 A1 * | 1/2005 | Stebnicki ............ B29C 47/0019 |
| | | 29/895.32 |
| 2006/0249644 A1 | 11/2006 | Folliot et al. |
| 2008/0197654 A1 | 8/2008 | Livesey et al. |
| 2009/0000424 A1 | 1/2009 | Taubmann et al. |
| 2009/0272869 A1 * | 11/2009 | Beneker ................ B60N 2/067 |
| | | 248/429 |
| 2010/0264288 A1 | 10/2010 | Thuleau et al. |
| 2012/0280104 A1 | 11/2012 | Veen et al. |
| 2013/0015313 A1 | 1/2013 | Schmid et al. |
| 2013/0334850 A1 | 12/2013 | Jefferies et al. |
| 2014/0033393 A1 | 2/2014 | Best |
| 2014/0246559 A1 | 9/2014 | Landskron et al. |
| 2014/0263891 A1 | 9/2014 | Landskron et al. |
| 2015/0126293 A1 | 5/2015 | Becker |
| 2016/0082863 A1 | 3/2016 | Kostin et al. |

FOREIGN PATENT DOCUMENTS

| | | |
|---|---|---|
| DE | 102008005773 B3 | 8/2009 |
| DE | 102009058333 A1 | 6/2011 |
| DE | 102012100715 A1 | 1/2013 |
| EP | 2330945 B1 | 4/2014 |
| FR | 2832362 A1 | 5/2003 |
| FR | 2883810 A1 | 10/2006 |
| FR | 2910393 A1 | 6/2008 |
| FR | 2928880 A1 | 9/2009 |
| FR | 2994901 A1 | 3/2014 |
| FR | 3001667 A1 | 8/2014 |

OTHER PUBLICATIONS

English Abstract of DE 102008005773 B3.
English Abstract of DE 102008005774 B3.
English Abstract of DE 102009058333.
English Abstract of DE 102012100715.
English Abstract of FR 2832362.
English Abstract of FR 2883810.
English Abstract of FR 2910393.
English Abstract of FR 2928880.
English Abstract of FR 2994901.
English Abstract of FR 3001667.

* cited by examiner

MODULAR PLASTIC MOTOR BRACKET

TECHNICAL FIELD

The present disclosure generally relates to motor brackets that may be used, for example, in connection with vehicle seat assemblies.

BACKGROUND

Some seat assemblies include motors to allow for motorized longitudinal movement of a seat, such as within a vehicle. In some configurations, the motor may be coupled to one or movable tracks that slide along one or more fixed tracks. A bracket may be used to connect and/or support the motor and/or a drive shaft between a pair of movable tracks.

SUMMARY

An embodiment of the present disclosure includes motor bracket comprising a first body portion, a second body portion, and/or a third body portion that may be configured to receive a drive shaft. In embodiments, the second body portion may be connected to the first body portion via a plurality of connecting members. At least a portion of the third body portion may be disposed inside the second body portion. The first body portion may include a plurality of wings that may extend in an outward direction from the first body portion. At least one of the plurality of wings may include an accessory aperture. Each wing may include a plurality of endcap apertures. The first body portion may include a substantially L-shaped flange. The flange may include a hooked portion. The first body portion, the second body portion, and/or the third body portion may include substantially the same shape. The first body portion, the second body portion, and/or the third body portion may be cylindrically-shaped. The first body portion, the second body portion, and/or the third body portion may each have different radii. The first body portion, the second body portion, and/or the third body portion may be disposed concentrically with each other. The first body portion and the second body portion may be disposed at a distance from each other and/or may define a chamber therebetween. At least one of a sound dampening material and a vibration dampening material may be disposed in the chamber.

In embodiments, a motor bracket may comprise a body that may include a first body portion, a second body portion, and/or a third body portion that may be configured to receive a drive shaft. The bracket may include a first endcap that may be configured to connect the body to a first track. The bracket may include a second endcap that may be configured to connect the body to a second track. The body may be configured for a tool-less connection with the first endcap and the second endcap. At least one of the first endcap and the second endcap may be configured to house a motor. The first endcap and/or the second endcap may include a plurality of locking tabs that may be configured to engage endcap apertures. The first endcap and/or the second endcap may be configured to receive at least a portion of the first body portion. The first endcap and the second endcap may be configured as separate components from the first body portion, the second body portion, and/or the third body portion.

In embodiments, a motor bracket may include a first body portion, a second body portion, and/or a third body portion that may be configured to receive a drive shaft. At least a portion of the third body portion may disposed inside the second body portion. The first body portion and the second body portion may include a first material, and/or the third body portion may include a second material. The first material may include Nylon 6, and/or the second material may include Nylon 12. The motor bracket may comprise a plurality of connecting members that may be connected between the first body portion and the second body portion. The connecting members may include the first material.

Various aspects of the present disclosure will become apparent to those skilled in the art from the following detailed description of the various embodiments, when read in light of the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications and equivalents, which may be included within the spirit and scope of the present disclosure as defined by the appended claims.

Figure 1A:
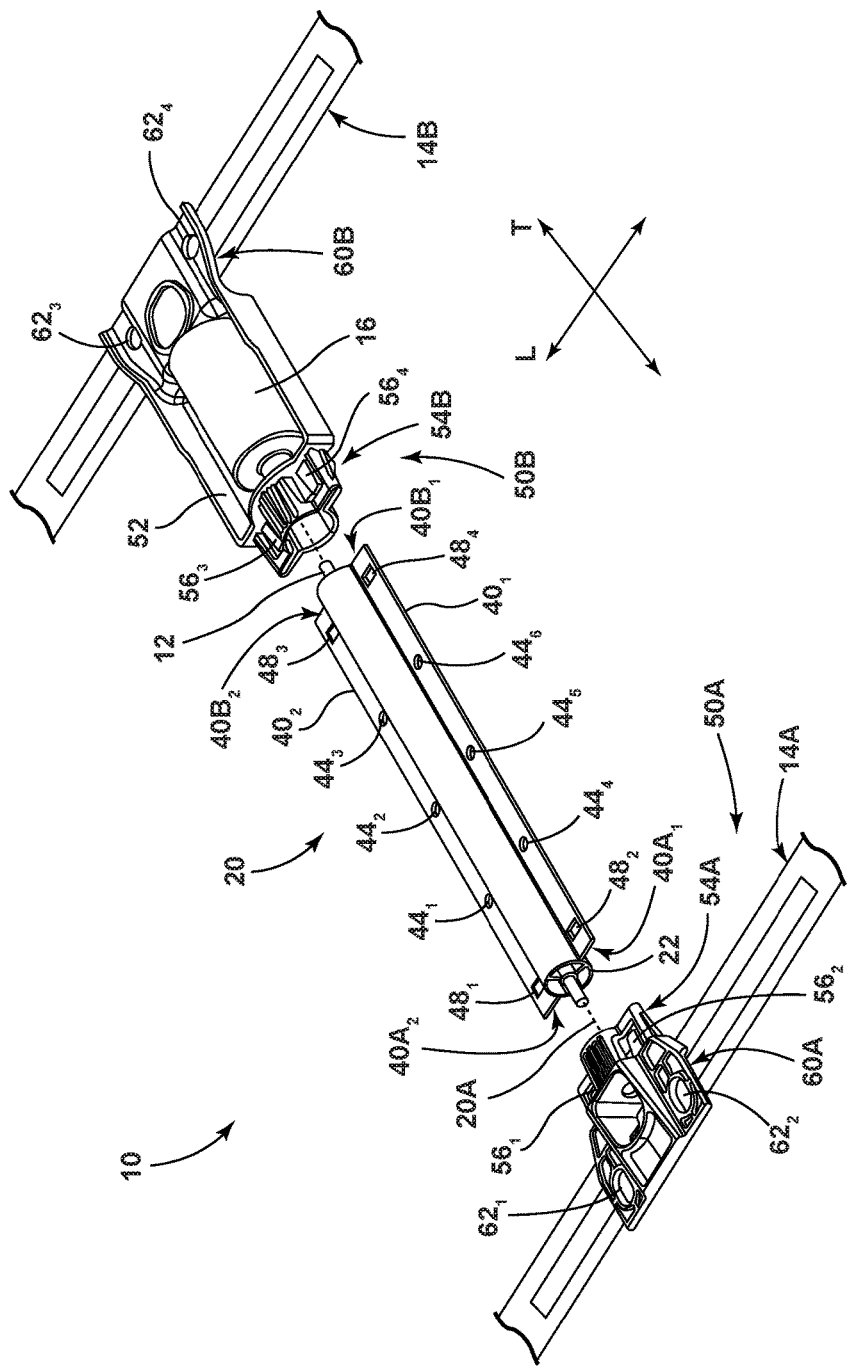
FIGS. 1A and 1B are perspective views generally illustrating portions of motor brackets in accordance with embodiments of the present disclosure.
Figure 1B:
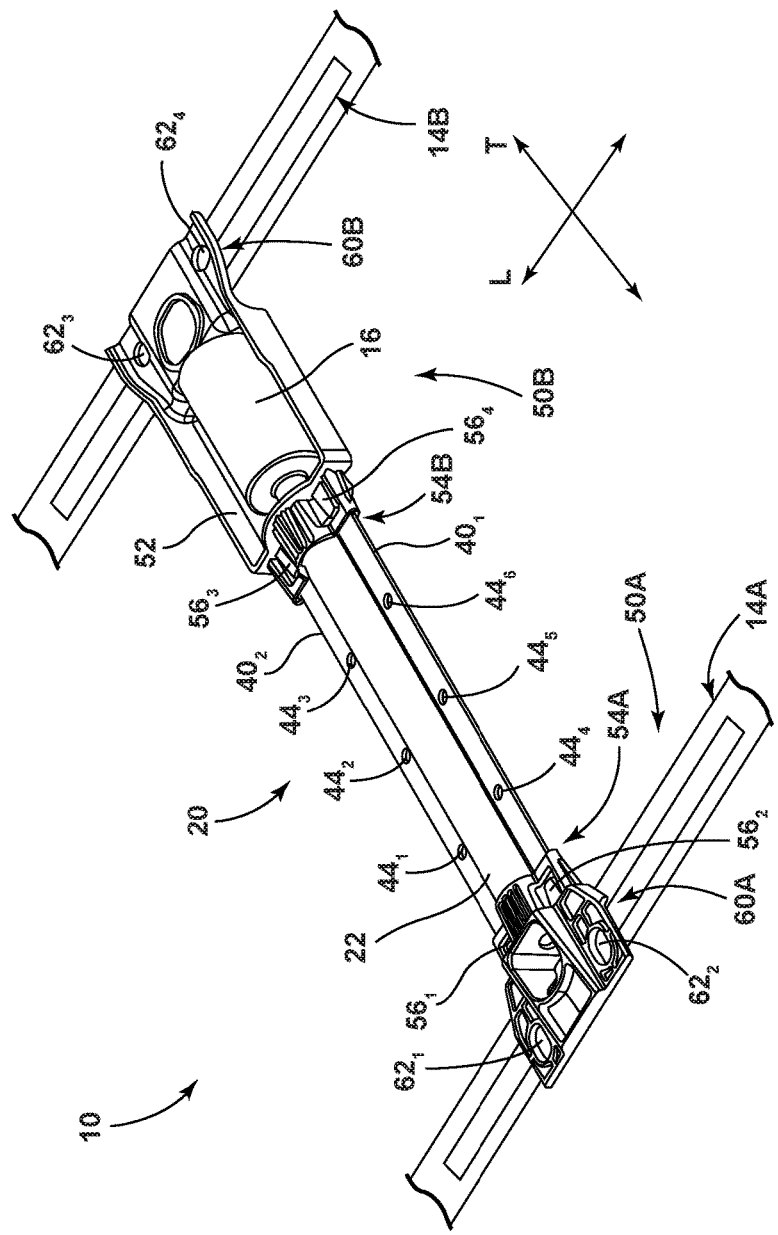

In embodiments, such as generally illustrated in FIGS. 1A and 1B, a motor bracket 10 may include a body 20 and/or a plurality of endcaps 50A, 50B. Motor bracket 10 may be connected to a track/rail 14A, 14B (e.g., a seat slide rail) via endcaps 50A, 50B. Motor bracket 10 may include a motor shaft 12, which may be configured to facilitate movement of a movable track (which may be connected to a seat) relative to a fixed track. Motor shaft 12 may be inserted at least partially into motor bracket 10, and may be configured to rotate therein. In embodiments, body 20 may include a first body portion 22, a second body portion 24, a third body portion 26, and/or wings $40_N$, such as wings $40_1$ and $40_2$ (see also, FIGS. 3A-3D).

In embodiments, such as generally illustrated in FIGS. 1A, 1B, 2A, 2B, 2C, and 4, wings $40_N$ may include one or more accessory connection features (e.g., features $44_N$, 46), such as apertures and/or flanges. With embodiments, accessory connection features $44_N$, 46 may facilitate attachment of various components, such as wire harnesses and/or accessory attachments. In embodiments, accessory connection features $44_N$ may include accessory apertures (e.g., apertures $44_1$, $44_2$, $44_3$, $44_4$, $44_5$, and $44_6$). Accessory apertures may include one or more of a variety of shapes, and may, for example, be substantially oval-shaped, rounded, circular, rectangular, and/or other desired shapes. Accessory apertures $44_N$ may be disposed along some or all of the length of body 20 and/or may be equally spaced from each other. In embodiments, wings $40_N$ and first body portion 22 may include substantially the same lengths and/or wings $40_N$ may include one or more endcap connection features $48_N$. Endcap connection features $48_N$ may or may not include endcap apertures (e.g., apertures $48_1$, $48_2$, $48_3$, and $48_4$). In embodiments, endcap connection features $48_N$ may be configured to connect body 20 with endcaps 50A, 50B. For example, and without limitation, endcap features $48_N$ may be substantially rectangular shaped, and/or endcap apertures $48_N$ may be disposed at or about an end or ends (e.g., ends $40A_1$, $40A_2$, $40B_1$, $40B_2$) of wings $40_N$.

With embodiments, motor bracket 10 may include a plurality of endcaps 50A, 50B, which may be configured to connect motor bracket 10 to a seat slide rail 14. Endcaps 50A, 50B may be configured as separate components from body 20. At least one of endcaps 50A, 50B may or may not be configured to house a motor 16. An endcap 50A, 50B configured to house a motor 16 may include a motor recess 52 that may be configured to receive at least a portion of motor 16 and may, for example, include a substantially rectangular shape. In embodiments, endcaps 50A, 50B may include a collar portion 54A, 54B and/or a rail connection portion 60A, 60B. In embodiments, endcaps 50A, 50B may be used with bodies 20 of different lengths, which may allow embodiments of motor bracket 10 to be used in a variety of applications without changes to endcaps 50A, 50B (e.g., allow for various distances between tracks/rails 14A, 14B and/or allow bracket 10 to be modular).

A collar portion 54A, 54B may be configured for receiving at least a portion of body 20. For example, and without limitation, the cross section of collar portions 54A, 54B (e.g., viewed along body longitudinal axis 20A) may be substantially similar to the cross section of body 20 and/or at least a portion of body may slide into collar portions 54A, 54B.

In embodiments, endcaps 50A, 50B may each include a rail connection portion 60A, 60B that may extend wider (e.g., in a transverse direction T) than motor recess 52 and/or collar portions 54A, 54B. Endcap rail connection portions 60A, 60B may include one or more rail apertures $62_N$ (e.g., $62_1$, $62_2$, $62_3$, and $62_4$) that may be disposed at or about the end of rail connection portions 60A, 60B, and/or may be configured for connecting motor bracket 10 to a track/seat slide rail 14A, 14B. Endcap rail apertures $62_N$ may, for example, include a substantially oval shape.

Figure 2C:
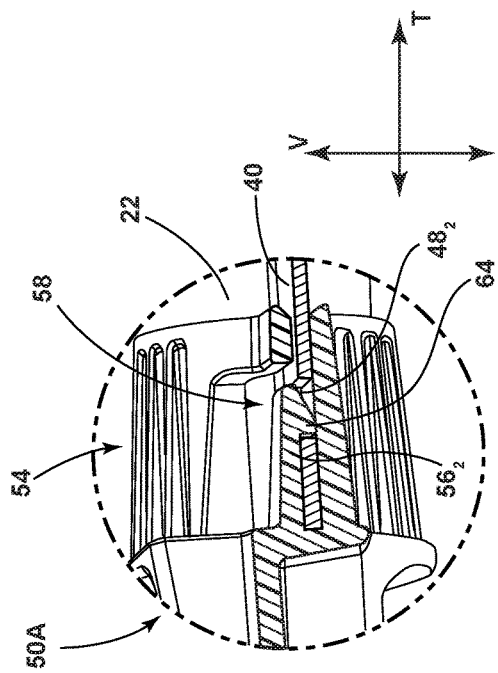
FIG. 2C is a cross-sectional perspective view generally illustrating endcap locking tabs in accordance with embodiments of the present disclosure.
Figure 2B:
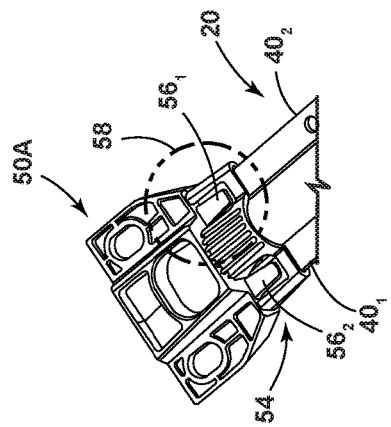
FIGS. 2A and 2B are perspective views generally illustrating portions of motor brackets, including bodies and endcaps in accordance with embodiments of the present disclosure.
Figure 2A:
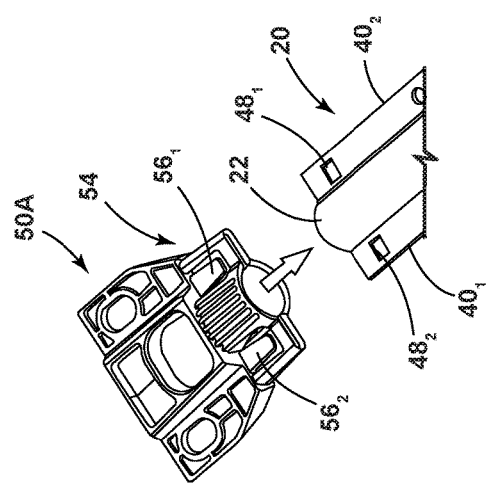
Figure 3B:
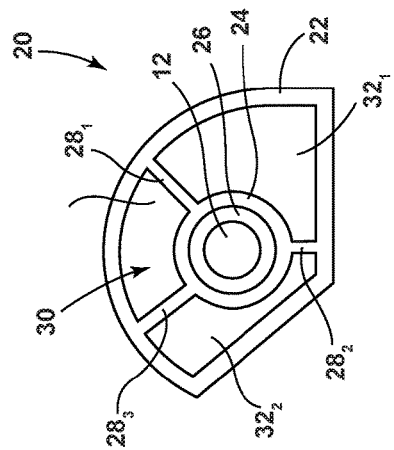
FIGS. 3A, 3B, 3C, and 3D are cross-sectional views generally illustrating embodiments of first body portions, second body portions, and third body portions in accordance with the present disclosure.
Figure 3D:
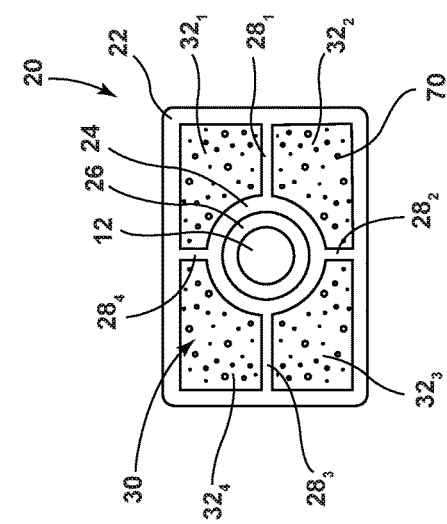
Figure 3A:
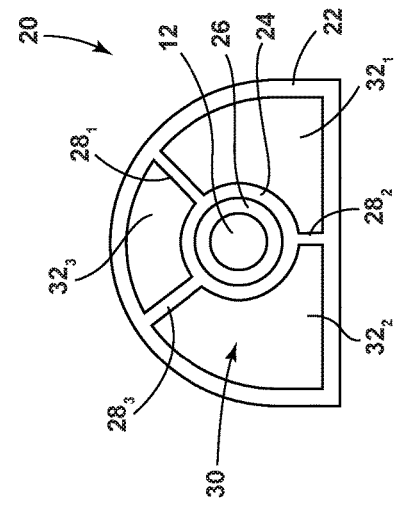
Figure 3C:
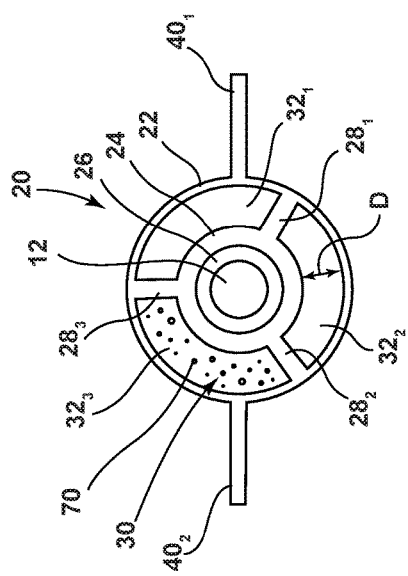

In embodiments, such as generally illustrated in FIGS. 2A, 2B, and 2C, body 20 may at least partially engage endcaps 50A, 50B, which may include first body portion 22 and/or wings $40_N$ sliding into endcap collar portions 54A, 54B. Endcaps 50A, 50B may include one or more locking tabs $56_N$ (e.g., tabs $56_1$, $56_2$, $56_3$, and $56_4$) that may be disposed on opposites sides of endcaps 50A, 50B. For example, endcaps 50A, 50B may include a locking tab $56_N$ aligned with opposite sides of body 20 (e.g., endcap 50A may include locking tabs $56_1$, $56_2$ and/or endcap 50B may include locking tabs $56_3$, $56_4$). Locking tabs $56_N$ may include tooth-shaped portions 64, which may selectively engage endcap apertures $48_N$ to couple endcaps 50A, 50B with body 20. In embodiments, endcap locking tabs $56_N$ may move in a substantially vertical direction V to selectively engage endcap apertures $48_N$. For example, locking tabs $56_N$ may selectively engage endcap apertures $48_N$ from a top and/or a bottom of wings $40_N$. In embodiments, endcaps 50A, 50B may engage body 20 via a snap connection 58 (e.g., tabs 56+ snapping into endcap apertures $48_N$), which may permit assembly of motor bracket 10 without the use of tools (e.g., hammer, wrench, screwdriver, specialized tool, etc). For example, if body 20 slides into an endcap (e.g., endcap 50A and/or endcap 50B), locking tabs $56_N$ may initially deflect upward, and/or upon further insertion, locking tabs $56_N$ may deflect/snap downward into endcap apertures $48_N$.

In embodiments, snap connection 58 may permit connection of endcaps 50A, 50B with body 20 in a plurality of orientations. For example, and without limitation, endcaps 50 may connect with body 20 if body 20 is in an upright state, and/or endcaps 50A, 50B may connect with body 20 when body 20 is rotated about a body axis 20A. In embodiments, first body portion 22 and/or wings $40_N$ may be symmetrical about a plane (e.g., a plane substantially parallel to a mounting surface and/or a vehicle floor), which may permit body 20 to connect with endcaps 50A, 50B in at least two orientations (e.g., upright and rotated about 180 degrees).

In embodiments, such as generally illustrated in FIGS. 3A, 3B, 3C, and 3D, motor bracket 10 may include a body 20, which may include a first body portion 22, a second body portion 24, and/or a third body portion 26. Body 20 may or may not be configured to support a motor shaft 12, and/or connect a motor 16, a motor shaft 12 (e.g., a drive shaft), and/or endcaps 50 to a track/seat slide rail 14. With embodiments, at least a section of third body portion 26 may be disposed inside second body portion 24, at least a section of second body portion 24 may be disposed inside first body portion 22, and/or at least a section of third body portion 26 may be disposed inside first body portion 22. First body portion 22, second body portion 24, and/or third body portion 26 may include one or more of a variety of shapes, sizes, and/or configurations. For example, and without limitation, first body portion 22 may include a cross section that generally resembles a circle (see, e.g., FIG. 3A), a semicircle (see, e.g., FIG. 3B), a rectangle (see, e.g., FIG. 3C), and/or a combination of straight and curved sides (see, e.g., FIG. 3D). In embodiments, first body portion 22, second body portion 24, and/or third body portion 26 may be cylindrically-shaped, and/or may each have different radii. First body portion 22, second body portion 24, and/or third body portion 26 may or may not be disposed concentrically with each other.

In embodiments, first body portion 22 may include one or more wings $40_N$ that may extend outwardly from first body portion 22 (e.g., radially outward relative to body longitudinal axis 20A). With embodiments, wings $40_N$ may be generally planar and/or may extend along all or part of the length of first body portion 22, second body portion 24, and/or third body portion 26. For example, and without limitation, wings $40_N$ may be disposed 180 degrees from each other (e.g., relative to body axis 20A) and/or may extend in a plane generally parallel with a mounting surface (e.g., a vehicle floor).

In embodiments, first body portion 22 and second body portion 24 may include a first material, which may be configured to provide structural support/strength for body 20. For example, and without limitation, first material may include Nylon 6. In embodiments, third body portion 26 may include a second material, which may include a low friction material and/or a sound dampening material. For example, and without limitation, second material may include Nylon 12. In embodiments, first body portion 22, second body portion 24, and/or third body portion 26 may be coextruded, which may include coextruding first body portion 22, second body portion 24, and/or third body portion 26 with a plurality of materials. For example, and without limitation, first body portion 22 and second body portion 24 may be extruded with a first material, and third body portion 26 may be extruded with a second material. First body portion 22, second body portion 24, and/or third body portion 26 may be coextruded so that at least a portion of third body portion 26 may be disposed within first body portion 22 and/or second body portion 24, and at least a portion of second body portion 24 may be disposed within first body portion 22.

In embodiments, motor bracket 10 may include at least one connecting member $28_N$ (e.g., members $28_1$, $28_2$, and $28_3$), which may be configured to support second body portion 24 and/or third body portion 26 relative to first body portion 22 (or vice versa). For example, connecting members $28_N$ may extend from at or about an outer surface of second body portion 24 to at or about an inner surface of first body portion 22. In embodiments, connecting members $28_N$ may be circumferentially spaced from one another (e.g., relative to body longitudinal axis 20A) and may or may not be equally spaced from each other. For example, and without limitation, motor bracket 10 may include three connecting members $28_1$, $28_2$, $28_3$, which may be separated by about 120 degrees from one another around second body portion 24. In embodiments, first body portion 22 and second body portion 24 may be disposed at a distance D from each other (e.g., a radial distance relative to body longitudinal axis 20A) that may correspond to a length of one or more of connecting members $28_N$ (e.g., connecting members $28_N$ may define distance D). A chamber 30 may be defined between first body portion 22 and second body portion 24, and/or chamber 30 may include one or more chamber portions $32_N$ (e.g., portions $32_1$, $32_2$, $32_3$). The plurality of connecting members $28_N$ may correspond to chamber portions $32_N$ within first body portion 22. For example, and without limitation, motor bracket 10 may include three connecting members $28_N$, which may define a first chamber portion $32_1$, a second chamber portion $32_2$, and/or a third chamber portion $32_3$. Chamber portions $32_N$ may or may not be in fluid communication with each other. In embodiments, dampening material 70 (e.g., sound dampening material and/or vibration dampening material) may be disposed in chamber portions $32_N$, which may reduce sound and/or vibration.

Figure 4:
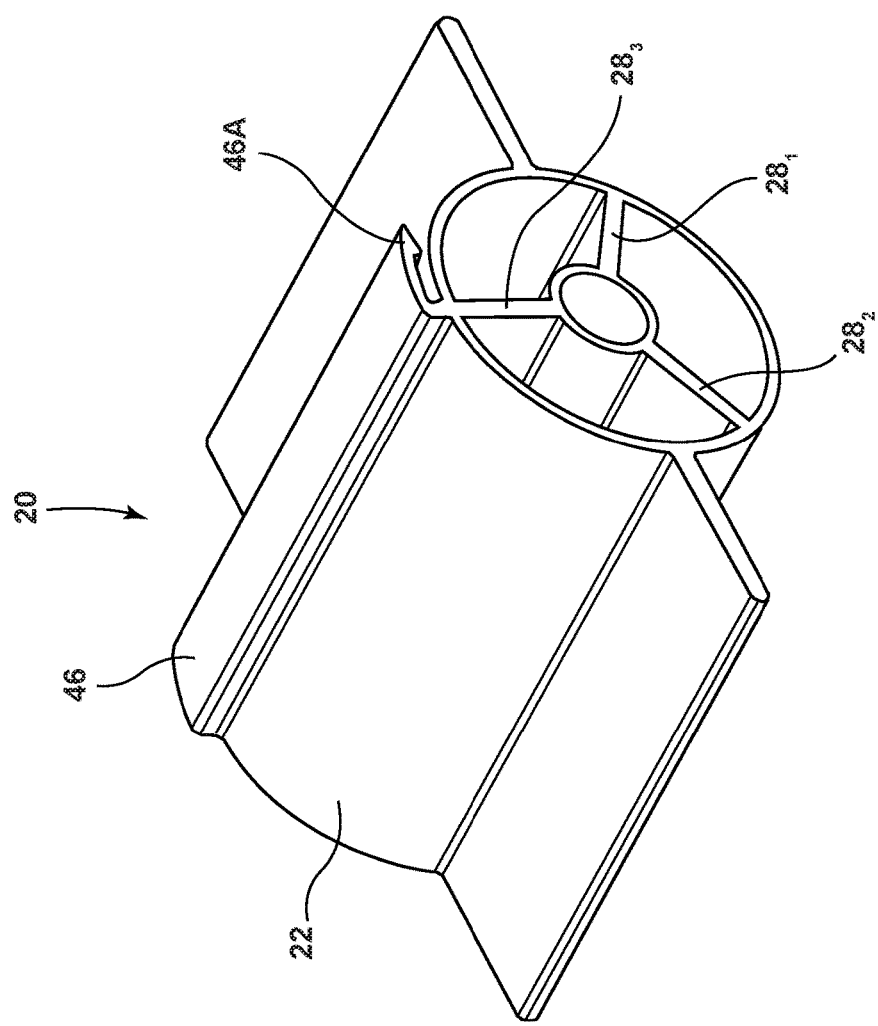
FIG. 4 is a perspective view generally illustrating a first body portion, a second body portion, and an accessory connection feature in accordance with embodiments of the present disclosure.

In embodiments, such as generally illustrated in FIG. 4, motor bracket 10 may include body 20 and an accessory connection feature 46. For example, accessory connection feature 46 may be configured to connect additional members to body 20. In embodiments, accessory connection feature 46 may include an accessory flange, which may extend from first body portion 22, and may be referred to herein as accessory flange 46, but is not limited to a flange. For example, accessory flange 46 may be configured to connect a wire harness to body 20. In embodiments, accessory flange 46 may include one or more of a variety of shapes, sizes, and/or configurations. For example, and without limitation, accessory flange 46 may be substantially L-shaped, and/or may include a substantially hook shaped portion 46A. In embodiments, accessory flange 46 may be disposed on body 20. For example, and without limitation, accessory flange 46 may be disposed at or about the top of body 20, and/or accessory flange 46 may be aligned (e.g., radially) with a connecting member $28_N$ (e.g., connecting member $28_3$). In embodiments, accessory flange 46 may extend along some or all of the longitudinal lengths of first body portion 22, second body portion 24, and/or third body portion 26. In embodiments, accessory flange 46 may or may not include the same material as first body portion 22. For example, and without limitation, accessory flange 46 may include Nylon 12.

Figure 5:
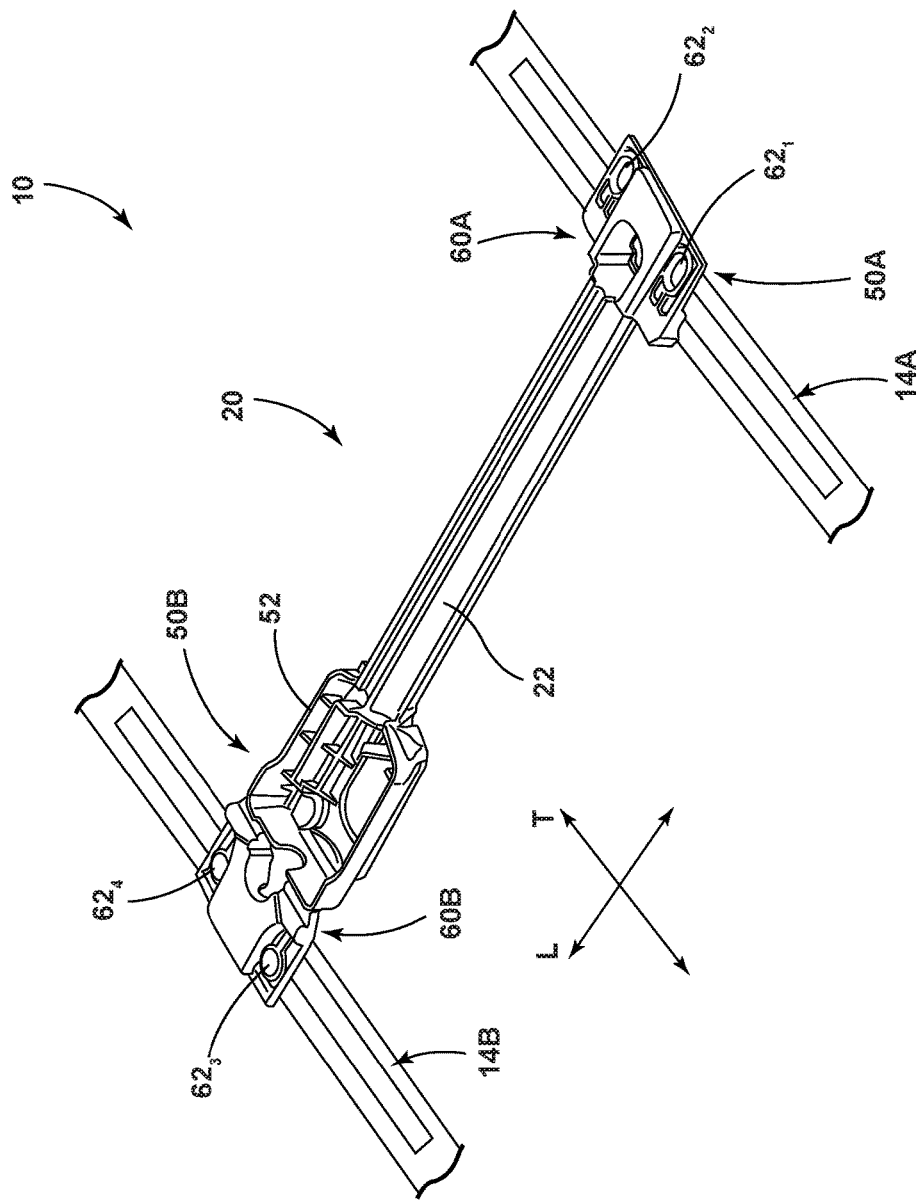
FIG. 5 is a perspective view generally illustrating portions of a motor bracket in accordance with embodiments of the present disclosure.

In embodiments such as generally illustrated in FIG. 5, motor bracket 10 may include body 20 integrally formed with endcaps 50A, 50B. For example, first body portion 22 and/or wings $40_N$ may be connected to endcaps 50A, 50B to form one piece.

Figure 6:
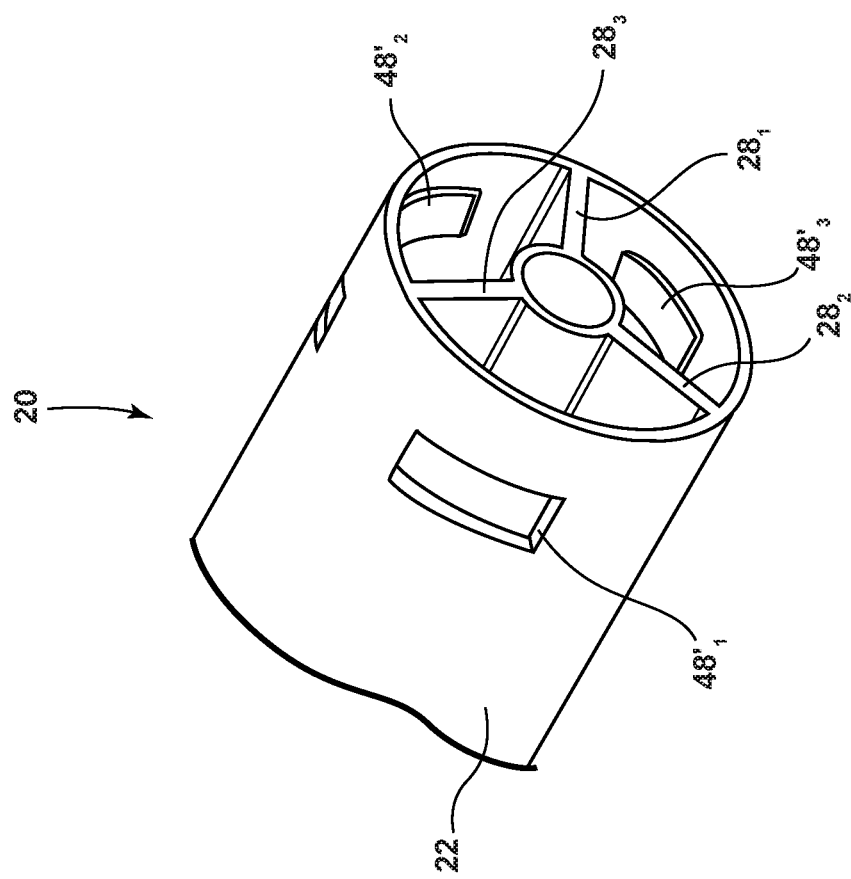
FIG. 6 is a perspective view generally illustrating a first body portion and a second body portion in accordance with embodiments of the present disclosure.

In embodiments, such as generally illustrated in FIG. 6, motor bracket 10 may include body 20 and endcap connection features $48'_N$. Endcap connection features $48'_N$ may or may not include circumferential endcap apertures (e.g., apertures $48'_1$, $48'_2$, and $48'_3$). In embodiments, circumferential endcap apertures $48'_N$ may be configured to connect body 20 with endcaps 50A, 50B. For example, and without limitation, circumferential endcap apertures $48'_N$ may be substantially rectangular-shaped, and/or circumferential endcap apertures $48'_N$ may be disposed circumferentially around first body portion 22. In embodiments, locking tabs $56_N$ (which may be configured in a manner analogous to those illustrated in FIGS. 1A-2C) may selectively engage circumferential endcap apertures $48'_N$ to couple endcaps 50A, 50B with body 20. In embodiments, endcap locking tabs $56_N$ may initially move outward (e.g., radially outward relative to longitudinal axis 20A) to selectively engage circumferential endcap apertures $48'_N$ from the outside and/or may initially move inward (e.g., radially inward relative to longitudinal axis 20A) to engage circumferential endcap apertures $48'_N$ from the inside of body 20. For example, and without limitation, one or more of endcap locking tabs $56_N$ may extend into body 20.

In embodiments, method of assembling a motor bracket 10 may include connecting endcaps 50A, 50B to body 20, and/or connecting endcaps 50A, 50B to seat slide rails 14A, 14B. For example, connecting endcaps 50A, 50B to body 20 may include inserting first body portion 22 and/or wings $40_N$ into endcap collar portion 54 such that locking tabs $56_N$ initially deflect and then snap into endcap apertures $48_N$. With embodiments, motor bracket 10 may be assembled/body 12 may be connected with endcaps 50A, 50B independently of tools (e.g., a tool-less assembly/connection).

In embodiments, connecting endcaps 50A, 50B to seat slide rails 14A, 14B may include connecting rail connection portions 60A, 60B to seat slide rails 14A, 14B, such as via one or more fasteners.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. It should also be understood that references to a spring are not limited to a particular type of spring and may include, without limitation, any type of biasing member and/or material. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A motor bracket comprising:
a first body portion;
a second body portion; and
a third body portion configured to receive a drive shaft;
wherein the first body portion includes a plurality of wings extending in an outward direction from the first body portion;
wherein the second body portion is connected to the first body portion via a plurality of connecting members;
wherein at least a portion of the third body portion is disposed inside the second body portion; and at least one of the plurality of wings includes at least one of an endcap aperture and an accessory aperture.

2. The motor bracket of claim 1, wherein the first body portion includes a substantially L-shaped flange.

3. The motor bracket of claim 2, wherein the flange includes a hooked portion.

4. The motor bracket of claim 1, wherein the first body portion, the second body portion, and the third body portion include substantially the same shape.

5. A motor bracket comprising:
a body including:
a first body portion;
a second body portion; and
a third body portion configured to receive a drive shaft;
a first endcap configured to connect the body to a first track; and
a second endcap configured to connect the body to a second track;
wherein the body is configured for a tool-less connection with the first endcap and the second endcap; and a first end of the first body portion is connected to the first endcap and a second end of the first body portion is connected to the second endcap.

6. The motor bracket of claim 5, wherein the first body portion includes a plurality of wings extending in an outward direction from the first body portion.

7. The motor bracket of claim 6, wherein at least one of the plurality of wings includes a plurality of accessory apertures.

8. The motor bracket of claim 6, wherein each wing of the plurality of wings includes a plurality of endcap apertures.

9. The motor bracket of claim 5, wherein the first body portion, the second body portion, and the third body portion are cylindrically-shaped.

10. The motor bracket of claim 5, wherein the first body portion, the second body portion, and the third body portion each have different radii.

11. The motor bracket of claim 5, wherein the first body portion, the second body portion, and the third body portion are disposed concentrically with each other.

12. The motor bracket of claim 5, wherein the first body portion and the second body portion are disposed at a distance from each other and define a chamber therebetween.

13. The motor bracket of claim 12, wherein at least one of a sound dampening material and a vibration dampening material is disposed in the chamber.

14. The motor bracket of claim 5, wherein at least one of the first endcap and the second endcap is configured to house a motor.

15. The motor bracket of claim 5, wherein the first endcap and the second endcap each include a plurality of locking tabs configured to engage endcap apertures.

16. The motor bracket of claim 5, wherein the first endcap and the second endcap are configured to receive at least a portion of the first body portion.

17. The motor bracket of claim 5, wherein the first endcap and the second endcap are configured as separate components from the first body portion, the second body portion, and the third body portion.

18. A motor bracket comprising: a body including:
a first body portion; a second body portion; and
a third body portion configured to receive a drive shaft;
wherein at least a portion of the third body portion is disposed inside of and in contact with the second body portion;
wherein the first body portion and the second body portion include a first material configured to provide strength to the body; the third body portion includes a second material; the second material includes a low friction material configured to facilitate rotation of said drive shaft with respect the third body portion; and the first body portion is spaced from the second body portion by a plurality of connecting members that support the second body portion and the third body portion relative to the first body portion.

19. The motor bracket of claim 18, wherein the first material includes Nylon 6, and the second material includes Nylon 12.

20. The motor bracket of claim 18, wherein the plurality of connecting members include the first material.

* * * * *